United States Patent
Rasheed et al.

(10) Patent No.: US 10,423,915 B2
(45) Date of Patent: Sep. 24, 2019

(54) SYSTEM AND METHOD FOR WELL LIFECYCLE PLANNING VISUALIZATION

(71) Applicant: GE OIL & Gas ESP, Inc., Oklahoma City, OK (US)

(72) Inventors: Adam Rasheed, Glenville, NY (US); Jeremy Daniel Van Dam, Niskayuna, NY (US)

(73) Assignee: GE Oil & Gas ESP, Inc., Oklahoma City, OK (US)

( * ) Notice: Subject to any disclaimer, the term of this patent is extended or adjusted under 35 U.S.C. 154(b) by 284 days.

(21) Appl. No.: 15/613,071

(22) Filed: Jun. 2, 2017

(65) Prior Publication Data
US 2017/0351984 A1     Dec. 7, 2017

Related U.S. Application Data

(60) Provisional application No. 62/344,562, filed on Jun. 2, 2016.

(51) Int. Cl.
G06Q 10/06     (2012.01)
G06Q 10/04     (2012.01)
G06Q 50/06     (2012.01)

(52) U.S. Cl.
CPC ......... *G06Q 10/0637* (2013.01); *G06Q 10/04* (2013.01); *G06Q 50/06* (2013.01)

(58) Field of Classification Search
CPC .......................................... G06Q 10/00–50/00
USPC ............................................. 705/7.11–7.42
See application file for complete search history.

(56) References Cited

U.S. PATENT DOCUMENTS

| | | | | |
|---|---|---|---|---|
| 4,276,599 A | * | 6/1981 | Maricelli | G01V 3/38 324/323 |
| 4,327,412 A | * | 4/1982 | Timmons | G01V 11/002 324/323 |
| 5,033,550 A | * | 7/1991 | Johnson | E21B 23/03 166/105 |
| 5,992,519 A | * | 11/1999 | Ramakrishnan | E21B 43/00 166/250.01 |
| 6,041,856 A | | 3/2000 | Thrasher et al. | |
| 6,101,447 A | * | 8/2000 | Poe, Jr. | E21B 49/00 702/13 |

(Continued)

OTHER PUBLICATIONS

Luo, Dongkun, and Xu Zhao. "Modeling the operating costs for petroleum exploration and development projects." Energy 40.1 (2012): 189-195. (Year: 2012).*

(Continued)

*Primary Examiner* — Alan S Miller
(74) *Attorney, Agent, or Firm* — Crowe & Dunlevy, P.C.

(57) ABSTRACT

According to one embodiment, there is provided herein a system and method for producing a well lifecycle lift plan that includes considerations of multiple types of lift, multiple lift configurations associated with each lift type, and can be used to provide a prediction of when or if it would be desirable to change the lift plan at some time in the future. Another embodiment utilizes a heuristic database with rules that might be used to limit the solution space in some instances by restricting the solution to feasible configurations. A further embodiment teaches how multiple individual well optimization results might be combined with a reservoir model to obtain an optimized lift schedule for an entire field.

6 Claims, 9 Drawing Sheets

(56) References Cited

U.S. PATENT DOCUMENTS

| | | | |
|---|---|---|---|
| 6,634,426 B2* | 10/2003 | McCoy | E21B 43/121 137/487 |
| 6,795,773 B2* | 9/2004 | Soliman | E21B 43/26 166/250.1 |
| 6,795,798 B2* | 9/2004 | Eryurek | G05B 23/0254 702/188 |
| 6,980,940 B1* | 12/2005 | Gurpinar | E21B 43/00 703/10 |
| 7,243,730 B2 | 7/2007 | Casey | |
| 7,878,268 B2* | 2/2011 | Chapman | E21B 7/00 175/57 |
| 8,078,444 B2 | 12/2011 | Rashid et al. | |
| 8,214,186 B2* | 7/2012 | Cuevas | E21B 43/122 166/250.01 |
| 8,249,844 B2* | 8/2012 | Dale | E21B 41/00 703/10 |
| 8,352,227 B2* | 1/2013 | Klumpen | E21B 49/00 703/10 |
| 8,600,717 B2 | 12/2013 | Rashid et al. | |
| 8,670,966 B2* | 3/2014 | Rashid | G06Q 10/04 166/245 |
| 8,688,426 B2 | 4/2014 | Al-Shammari | |
| 8,775,141 B2* | 7/2014 | Raphael | E21B 43/00 703/10 |
| 8,818,777 B2* | 8/2014 | Howell | E21B 49/00 703/10 |
| 9,115,566 B2* | 8/2015 | Amudo | E21B 43/00 |
| 2002/0084071 A1* | 7/2002 | McCoy | E21B 43/121 166/255.1 |
| 2003/0050758 A1* | 3/2003 | Soliman | E21B 43/26 702/6 |
| 2005/0149307 A1* | 7/2005 | Gurpinar | E21B 43/00 703/10 |
| 2005/0199391 A1 | 9/2005 | Cudmore et al. | |
| 2007/0016389 A1* | 1/2007 | Ozgen | E21B 47/00 703/10 |
| 2007/0199721 A1* | 8/2007 | Givens | G06Q 10/06 166/382 |
| 2008/0103743 A1* | 5/2008 | Howell | E21B 49/00 703/10 |
| 2008/0133194 A1* | 6/2008 | Klumpen | E21B 49/00 703/10 |
| 2008/0140369 A1* | 6/2008 | Rashid | E21B 43/00 703/10 |
| 2008/0164036 A1* | 7/2008 | Bullen | E21B 43/129 166/377 |
| 2008/0262737 A1* | 10/2008 | Thigpen | E21B 43/00 702/9 |
| 2009/0012765 A1* | 1/2009 | Raphael | E21B 43/00 703/10 |
| 2009/0055029 A1 | 2/2009 | Roberson et al. | |
| 2009/0125362 A1* | 5/2009 | Reid | G06F 8/30 705/7.27 |
| 2009/0152005 A1* | 6/2009 | Chapman | E21B 7/00 175/24 |
| 2009/0198478 A1* | 8/2009 | Cuevas | E21B 43/122 703/10 |
| 2009/0299636 A1* | 12/2009 | Carnegie | E21B 47/00 702/6 |
| 2012/0095733 A1 | 4/2012 | Rossi | |
| 2012/0215364 A1* | 8/2012 | Rossi | E21B 43/121 700/281 |
| 2013/0173505 A1 | 7/2013 | Balogun et al. | |
| 2013/0332240 A1 | 12/2013 | Patri et al. | |
| 2013/0346040 A1* | 12/2013 | Morales German | G06F 17/5009 703/2 |
| 2014/0303949 A1* | 10/2014 | Boneti | G06F 17/5009 703/6 |
| 2016/0063146 A1* | 3/2016 | Bailey | G06F 17/10 703/2 |
| 2017/0351959 A1 | 12/2017 | Adam et al. | |

OTHER PUBLICATIONS

International Search Report and Written Opinion issued in connection with corresponding PCT Application No. PCT/US2017/035857 dated Jul. 19, 2017.

Azzaro, S.H., et al., Well lifecycle lift planning through reservoir, operations and production data fusion, GE co-pending U.S. Appl. No. 62/344,607, filed Jun. 2, 2016.

Moitra, A., et al., Method for evaluating artificial lift for oil wells, GE co-pending U.S. Appl. No. 62/344,581, filed Jun. 2, 2016.

Rasheed, A.N., Artificial lift selection layered visualization element, GE co-pending U.S. Appl. No. 62/344,545, filed Jun. 2, 2016.

Rasheed, A.N., et al., Method for well lift lifecycle planning, GE co-pending U.S. Appl. No. 62/344,593, filed Jun. 2, 2016.

Rasheed, A.N., et al., Lift evaluator self-learning method for rules, GE co-pending U.S. Appl. No. 62/344,623, filed Jun. 2, 2016.

* cited by examiner

*Figure 4*

Results

Sort by: PV   Technical Score   Production   Workovers   Capital Cost

Option 1: ESP-RP-GL ◄—— 412
ESP: TA400-E37
RP: C230-213-120
GL: config detail
PV: $100,000,000
Tech Score: 82
1,000,000 bbl
30000 bbl deferred
5 workovers
33 downtime days Option 2: ESP-ESP-RP ◄—— 413
ESP: TA550-E37
ESP: TA400-E37
GL: config detail
PV: $95,000,000
Tech Score: 93
1,120,300 bbl
24320 bbl deferred
3 workovers
28 downtime days Option 3: ESP-RP-GL ◄—— 414
RP: config detail
PL: config detail
PV: $60,000,000
Tech Score: 75
970,000 bbl
35600 bbl deferred
7 workovers
49 downtime days

410

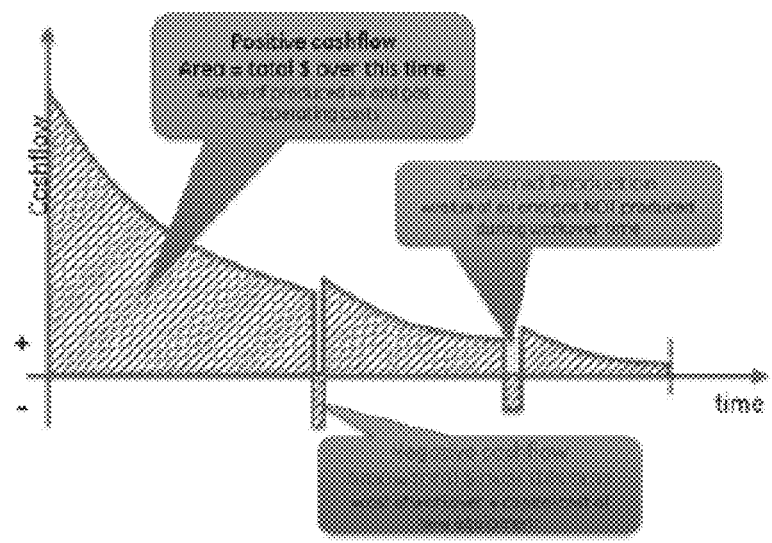

| | | | | | | | |
|---|---|---|---|---|---|---|---|
| Fluid Production (bbls) | 1,351,600 | 452,600 | 443,920 | 452,600 | 2,480 | 0 | 0 |
| Oil Production (bbls) | 202,740 | 67,920 | 66,522 | 67,920 | 372 | 0 | 0 |
| Gas Production (bbls) | 0 | 0 | 0 | 0 | 0 | 0 | 0 |
| Down Time (days) | 7 | 0 | 7 | 0 | 0 | 0 | 0 |
| Deferred Oil Production (bbls) | 1,302 | 0 | 1,302 | 0 | 0 | 0 | 0 |
| Deferred Gas Production (bbls) | 0 | 0 | 0 | 0 | 0 | 0 | 0 |

550

SYSTEM AND METHOD FOR WELL LIFECYCLE PLANNING VISUALIZATION

CROSS REFERENCE TO RELATED APPLICATIONS

This application claims the benefit of U.S. Provisional Patent Application Ser. No. 62/344,562, filed Jun. 2, 2016, titled "WELL LIFECYCLE PLANNING VISUALIZATION ELEMENT," the entire disclosure of which is incorporated herein by reference as if fully set out at this point.

TECHNICAL FIELD

This disclosure relates generally to production of hydrocarbons and, in more particular, systems and methods for optimizing and visualizing hydrocarbon production from a well over time.

BACKGROUND

Determining the most suitable type of artificial left to employ in a hydrocarbon producing well is a complex decision that involves a number of different factors including, for example, technical feasibility, lift parameters, operating costs, maintenance practices, reliability, target productions, engineering design, company preferences and other factors. Choosing a lift type is often made based on what has been done in the past and an individual's experience and judgement. In brief, these sorts of decisions are typically made with only a limited analysis of the consequences of a particular lift type.

Further, such a decision will typically be made based on the current status of the well (including its current production rate) and its expected future production as a function time as estimated by a production decline curve or "decline curve", hereinafter. Of course, fluid production from a hydrocarbon well is a dynamic quantity and the lift technology that is appropriate today might not be appropriate in the future.

Additionally, this decision will be made based on only a subset of the available lift types/parameter combinations. There are many different lift types and it is unlikely that all possibilities are considered for use in a particular well. Even after the lift type is selected additional decisions will need to be made regarding the particular equipment configuration. As one specific example, if it appears that an electrical submersible pump would be a good choice for a well, a decision will need to be made regarding the particular pump, motor, and cable to use. A key challenge is displaying the wide variety of options to the user in a way that facilitates decision making.

Even in circumstances where a well lifecycle plan is determined algorithmically, a single solution to a complex problem is often not very useful since real world considerations sometimes prevent an operator from following the plan exactly. In such a case, it would be helpful to be able to vary certain aspects of the optimum solution and see immediate feedback with respect to how much that would impact the objective function that was used to calculate the plan (e.g., minimum cost, maximum profit, maximum production, etc.).

As a result, even an optimum process incorporates a limited view of what might be the most suitable overall solution. Further, it might not contemplate if or when a future change in the well's decline curve would call for replacing the current lift type with one that more suitable to the then-current production level.

Thus, what is needed is a system and method of determining a good or optimal lift plan that includes a recommendation of an initial choice of artificial lift type and that further includes consideration of when initial lift type of lift needs to be changed in order to maximize the economic value of the well.

Further, what is needed is some way to visualize a recommendation based on a lifecycle calculation in a way that allows a user to adjust a proposed solution to provide information about alternatives if the recommend solution is not followed exactly.

Thus, what is needed is a method and apparatus that can be used to assist in lifecycle planning for a hydrocarbon well over its entire life or some extended time window.

Before proceeding to a description of the present invention, however, it should be noted and remembered that the description of the invention which follows, together with the accompanying drawings, should not be construed as limiting the invention to the examples (or embodiments) shown and described. This is so because those skilled in the art to which the invention pertains will be able to devise other forms of this invention within the ambit of the appended claims.

SUMMARY OF THE INVENTION

According to one embodiment, there is provided herein a system and method for producing a well lifecycle lift plan that includes considerations of multiple types of lift, multiple lift configurations associated with each lift type, and can be used to provide a prediction of when or if it would be desirable to change the lift plan at some time in the future.

According to a first embodiment, there is provided a three-level visualization system for use with an actionable lift plan. A first level would include a high level overview of each lift option in sortable panels. A second level viewing option would provide in-depth technical and financial details about the selected option. Further, a third level would provide an ability to explore variations on the selected option within the technically feasible constraints driven by calculations based, among others, on performance models associated with selected option. Note that for purposes of the instant disclosure, an actionable lift plan or "life plan" or "lifecycle plan" comprises at least the specific lift equipment configurations and the appropriate changeover times from one lift equipment configuration to another. Additionally, it may contain financial information such as the net present value, total equipment cost and detailed income statements. The technical details produced along with the lift plan could include parameters such as total fluid, oil, water and/or gas production, the deferred production, the down time, a quantitative risk or technical feasibility score, etc.

The foregoing has outlined in broad terms some of the more important features of the invention disclosed herein so that the detailed description that follows may be more clearly understood, and so that the contribution of the instant inventors to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

These and further aspects of the invention are described in detail in the following examples and accompanying drawings.

FIG. 4 contains an example level 1 screen display from an embodiment.

FIG. 10 contains another embodiment of a graphical display according to the instant disclosure.

DETAILED DESCRIPTION

Figure 1:
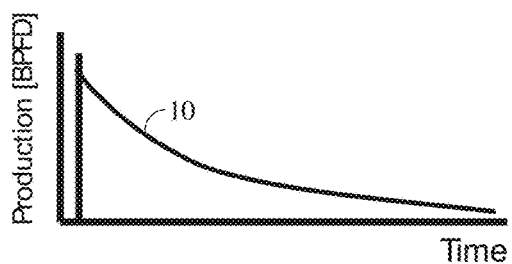
FIG. 1 is a schematic diagram that illustrates a prior art decline curve for a well.

While this invention is susceptible of embodiment in many different forms, there is shown in the drawings, and will herein be described hereinafter in detail, some specific embodiments of the instant invention. It should be understood, however, that the present disclosure is to be considered an exemplification of the principles of the invention and is not intended to limit the invention to the specific embodiments or algorithms so described.

Turning first to FIG. 1 which contains an example of a prior art well decline curve, it is well known in the reservoir engineering field to calculate a decline curve for a particular well. There are numerous acceptable methods of doing this including, for example, Arps algorithm, hyperbolic decline, exponential decline, harmonic decline, etc. FIG. 1 contains a schematic representation of a decline curve which illustrates production rate versus time for a hypothetical well, where "BPFD" on the "Y" axis represents "barrels of fluid per day". As is generally indicated, traditionally such curves are estimated using parameters such as an initial production rate value at, say, time $T_0$, an initial decline rate, the degree of curvature of the curve, etc. In other instances, the decline curve might come from a reservoir model. Rules of thumb and heuristics can provide adjustments to the standard decline curve for a well. All of this is well known.

Figure 6:
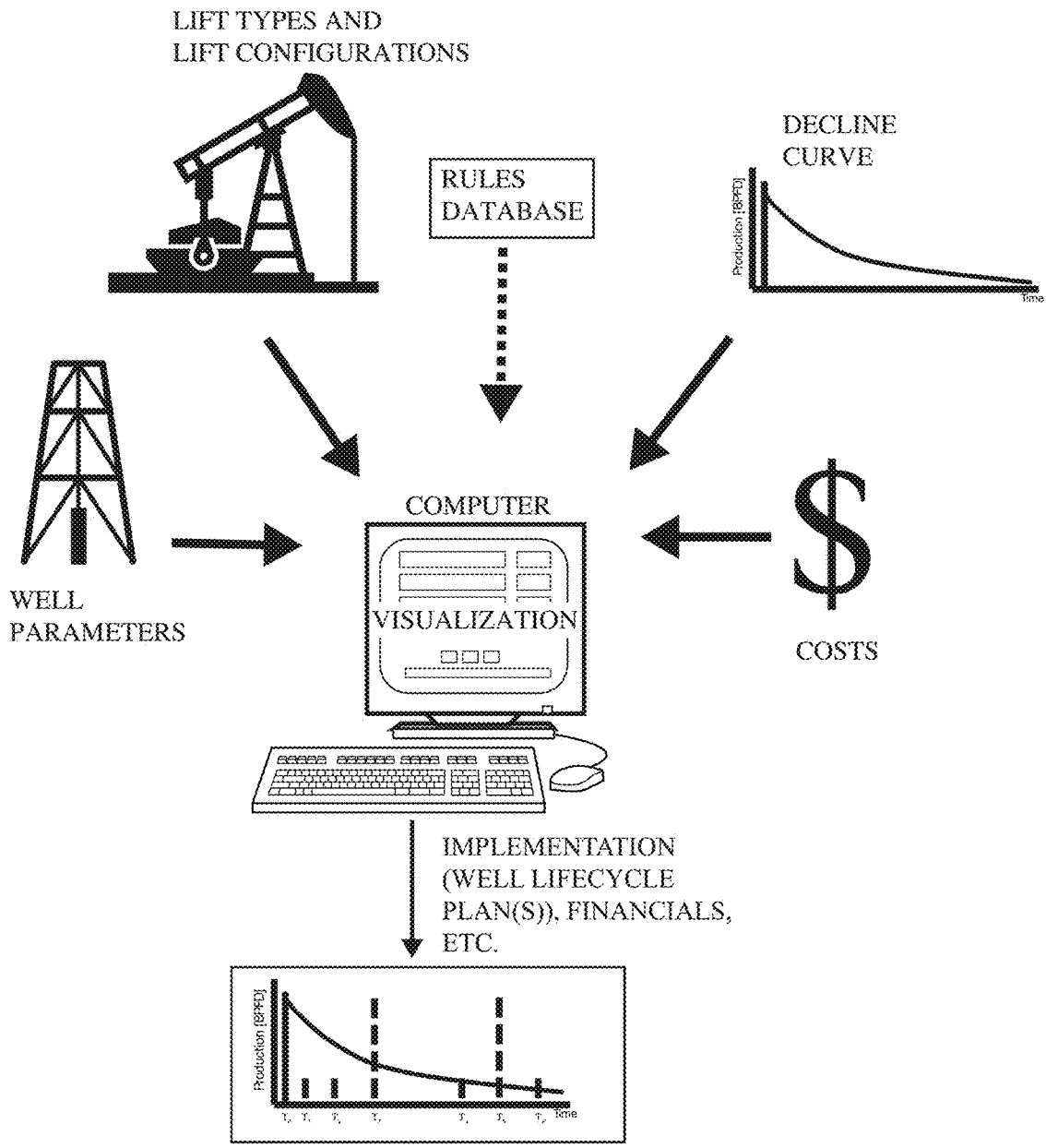
FIG. 6 contains a schematic illustration of an operating environment of an embodiment.

FIG. 6 contains an example operating environment of a visualization system for use with a well lifecycle embodiment. Parameters pertaining to the selected well will be accessed as input. These parameters might include the well depth, temperature, hydrocarbon type, water cut, etc. Additionally, a decline curve that is representative of the production from selected well over some period of time will be accessed. A selection of lift types and lift type configurations will also be specified. Cost (potentially including both operating and change over cost) is used as an objective function suitable for this embodiment, where the operating/changeover cost is specified for each lift type configuration. Operating cost might include a projection of expected energy cost over the subject time period. Given the foregoing, this embodiment will utilize a computer to produce a well lifecycle or implementation plan by formulating the problem as a network with the distance between nodes being a function of cost and then solving for the minimum distance path through the network. Optionally, a rules database that contains heuristic guidelines will used to shape the results of the computation.

An embodiment will provide visualization into, not just the optimal solution, but also alternatives that are in some way near optimal. The visualization will take place on a computer's attached graphical display or, more generally, on any display device suitable for presenting graphical and text information to a user. Display devices such as table computers, smart phones, smart terminals, etc., could also be used. In the event that the computational load of the visualization calculations is too much for the display device, the computations could be done remotely and communicated via a network (e.g., wired or wireless Ethernet, Bluetooth, WiFi, etc.) from the computational computer to the display device.

The user will be allowed to interactively manipulate the on-screen display (e.g., using a mouse, pointing device, light pen, keyboard, etc.) as described below. In some cases, the user will select with a mouse certain points on the graphical display corresponding to changeover points and adjust the timing on-screen, thereby possibly changing an optimal solution to a sub-optimal one if desired, where "sub-optimal" should be understood to mean a lifecycle plan that is a modified version of a pre-calculated plan that has been previously determined to minimize (or maximize) an objective function. The user's modification will potentially cause the value of the objective function for the modified plan to increase (or decrease if the objective function has been maximized). Simultaneously with the movement of the changeover point and in-real time any financial information or production data that is displayed will be recalculated to reflect the change in timing.

The sub-optimal solution will then be available to be taken into the field and implemented, thereby determining which lift and lift configuration to install and use (and at which point(s) to change it) over a predetermined time period. Note that one approach to calculating a well lifecycle plan may be found in the co-pending U.S. patent application "SYSTEM AND METHOD FOR WELL ARTIFICIAL LIFT LIFECYCLE PLANNING", U.S. patent application Ser. No. 15/612,937, the disclosure of which is incorporated herein by reference as if fully set out at this point.

With respect to the computer of FIG. 14, as a general matter when the term "computer" is used herein, that term should be broadly construed to include any active device including, without limitation, a processing unit, a field programmable gate array, discrete analog circuitry, digital circuitry, an application specific integrated circuit, a digital signal processor, a reduced instruction set computer, devices with multicore CPUs, etc. The foregoing also includes distributed or parallel processing systems where multiple computers contribute to a final solution. In brief, all is required is that the computer be minimally programmable in some sense and capable of accepting input of the sort described above. The computer can some amount of local internal memory (e.g., volatile and/or non-volatile memory devices) and storage, and potentially have access to memory or storage that is connectable to it via a network. The computer may access a computer application program stored in non-volatile internal memory, or stored in an external memory that can be connected to the computer via an input/output (I/O) port. The computer program application may include code or executable instructions that when executed may instruct or cause the central controller and other components to perform steps or functions embodying methods disclosed herein.

Figure 2:
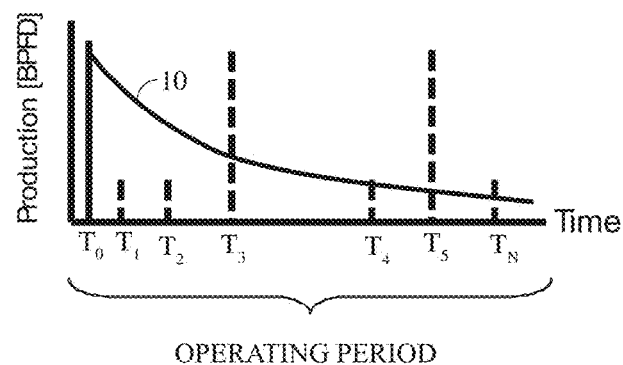
FIG. 2 contains an exemplary schematic diagram that illustrates a lift lifecycle plan for a well.
Figure 3:
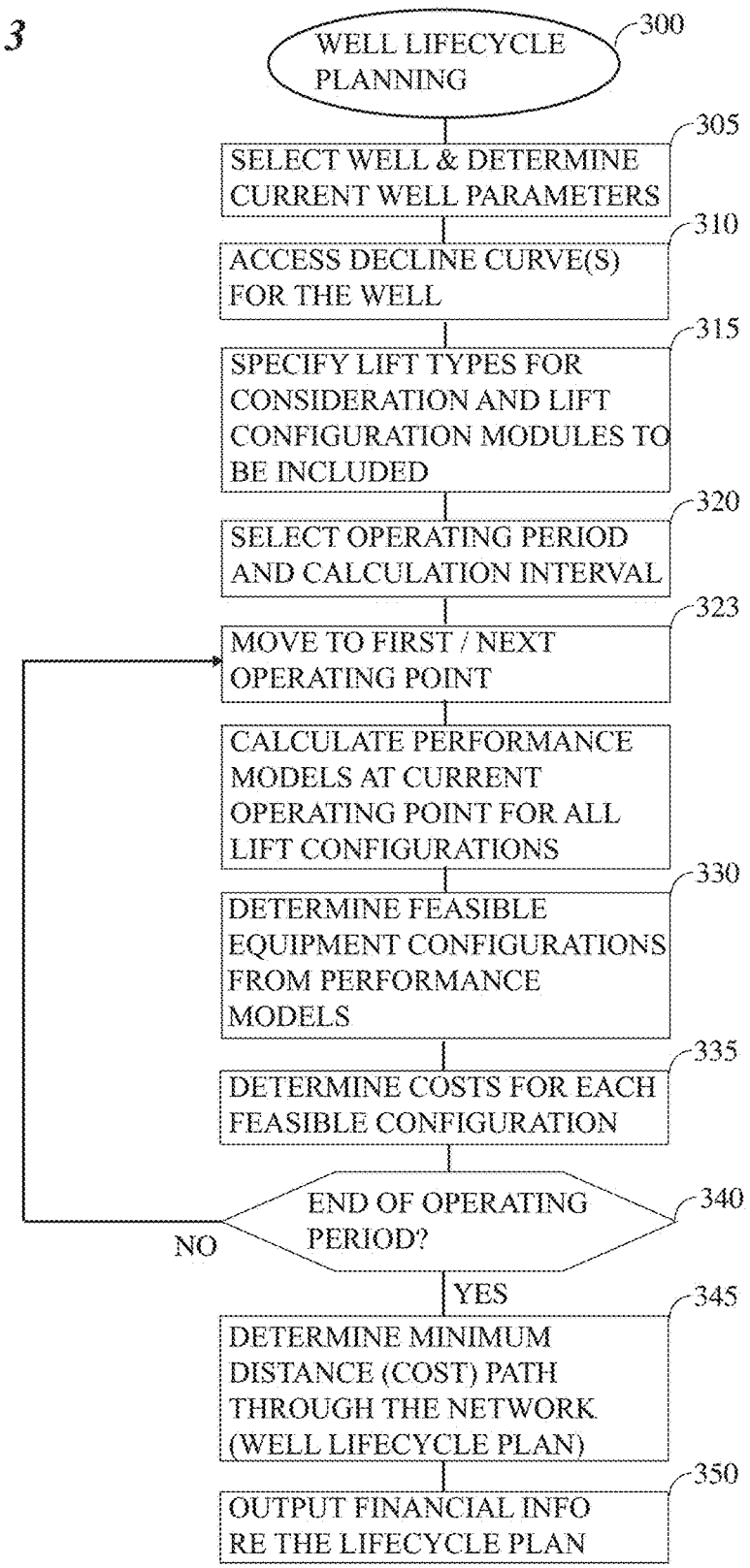
FIG. 3 contains an operating logic suitable for use with an embodiment of a well lifecycle computation.

FIG. 2 contains a simplified schematic representation of one embodiment of a well lifecycle plan produced according to the process of FIG. 3. In that regard, note that when the term "lifecycle" is used, that term should be understood to mean an artificial lift configuration plan that specifies over a particular time period a lift installation/configuration/replacement strategy for a well. An example of a well lifecycle plan is discussed more fully in connection with FIG. 2 below.

Returning to a discussion of FIG. 2, In this particular example, the lift type and associated parameters related to that lift type are selected at each time point are the ones that minimize the operating cost over the period of time from $T_0$ to $T_N$. In this figure, the type of lift is scheduled to be changed at times $T_3$ and $T_5$. At times $T_1$ and $T_2$ the initially selected lift type is scheduled to be reconfigured with different operating parameters. At $T_4$, the parameters associated with the lift type installed at $T_3$ are reconfigured. Taken together, the changes at $T_0$ to $T_5$ are designed to produce the minimum or near minimum operating cost of producing hydrocarbons from the subject well over the lifecycle/operating period.

Note that for purposes of the instant disclosure, the term "lifecycle time series" will be use indicate the action times $T_0$ to $T_N$ in FIG. 2 and the event(s) associated with each point in time where an action is recommended to be taken. In some cases the time series will comprise only the entries $T_0$ to $T_N$, whereas in other cases every calculation point between $T_0$ and $T_N$ will be assigned either an action or "no action" where no activity is recommended at intermediate times.

Turning next to FIG. 3, this figure contains a flowchart 300 suitable for use with one embodiment of a well lifecycle planning program. As an initial step 305, a well will be selected and various parameters about it determined according to methods well known to those of ordinary skill in the art. These parameters could include, for example, its current and historical production rate, the equipment that is currently in place, the depth of the producing formation, the diameter of the well, the oil water contact level, the gas-oil ratio, the oil-water ratio, the pay thickness, the lithology of the producing formation, the composition of the produced fluid (e.g., does it contain corrosive components, sand, etc.), API gravity, bottom hole temperature and pressure, etc. Information related to such might be useful in the steps that follow.

A decline curve or curves is obtained or calculated for the selected well according to methods well known in the art (box 310). Note that for purposes of this disclosure, a decline curve will be broadly interpreted to be a forecast of the relevant production parameters that would impact lift sizing. Thus, a decline curve might refer to an oil decline curve, a water decline curve, a gas decline curve, total fluid production, some combination of the foregoing, etc. In some embodiments that calculation will be done outside of the optimization program that is described below in connection with box 345. Note There are many different ways to obtain this curve as discussed above, but the particular method by which it is obtained is not important to the operation of the current embodiment.

Candidate lift types and available lift configuration modules for each lift type will need to be identified 315. Note that for purposes of the instant disclosure a "lift configuration module" is defined by a lift technology, i.e., the set of components used, any specialized configuration for the technology, and the range of operating conditions covered by the technology. Table 1 below contains some exemplary lift types and some configurable hardware components associated with each. As an example and for purposes of the instant embodiment, configuration of an electrical submersible pump (ESP) will involve sizing of a particular pump, motor, and cable length between the surface and the pump. Similarly, the performance of a PCP (progressing cavity pump) can be largely characterized by its pump, drivehead, and rods. Those of ordinary skill in the art will recognize that other lift types can be similarly characterized.

Continuing with the embodiment of FIG. 3, an operating period and calculation interval 320 will be selected. One combination of these two parameters that has proven to be useful in some instances is five years of operation calculated at monthly time intervals. Those of ordinary skill in the art will recognize that the extent of the operating time period might be longer or shorter and the number of time intervals increased or decreased depending on the characteristics of the chosen well and other factors. Clearly, as the operating time period increases and/or the calculation time interval decreases, the optimization problem will require more computer resources to calculate.

Next in the embodiment of FIG. 3, the first or next operating point will be selected 323, with the "first" point typically being the current time and the next point being separated in time from the first by the calculation interval, e.g., by one month.

According to this example, the first (or next, if this is the second or subsequent time passing through this box 323) will be identified and performance models will be calculated for each lift configuration (box 325) at the identified operating point. That is, given the well parameters and lift type the associated components will be sized according to standard petroleum engineering techniques at the current time point on the decline curve. For example, in the case of rod lift, standard RPL-12 provides guidance with respect to how to size it for different production and well scenarios.

In box 330, the universe of available equipment configurations of 325 will be examined to determine which are actually feasible for the given well at this time point as determined by the performance-model calculations. By eliminating those configurations that are not feasible at this point the size of the optimization that must be solved can potentially be substantially reduced. Of course, this step is not essential to the operation of this embodiment but it has proven to be useful in some instances to reduce the solution space that must be searched in order to find a minimum cost lifecycle plan. This might be done in many ways, but one preferred way is Bellman's one useful approach is generally illustrated by the curves in FIG. 5.

In brief, in the current embodiment lift configurations that have a performance envelope that does not enclose the decline curve will be designated as "not feasible". In more particular, in FIG. 5 at time $T_0$ four different artificial lift candidates have been identified: ESP1 (a first electrical submersible pump configuration), ESP (a second electrical submersible pump configuration), RP (a reciprocating piston configuration), and GL (a gas lift configuration). Of the four, ESP1 has been selected as an initial lift technology. The points in time at which well is to be evaluated for a possible change in the lift type are indicated by data points 530.

Figure 5:
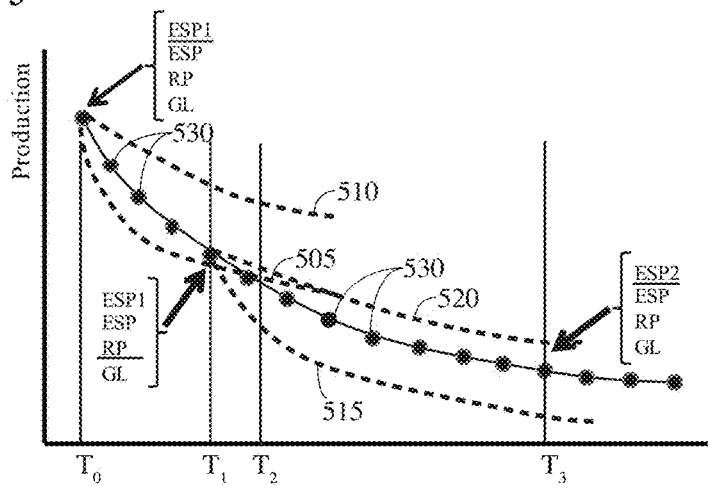
FIG. 5 illustrates a situation where a lift configuration might be excluded from consideration at a point in time where the decline curve does not fall within the boundaries of its performance envelope.

In this figure, the points $T_1$ and $T_3$ have been identified using an approach disclosed below as times when the lift could be changed to minimize the cost of lifting the hydrocarbons to the surface for this well. In the example of FIG. 5, at $T_1$ the recommendation is to change to the RP lift type. At $T_3$, the recommendation is to change to lift configuration ESP2.

Associated with ESP1 is the operating envelope for this particular lift configuration which is indicated by curves 505 and 510. As can be noted in this figure, between times $T_0$ and $T_2$ the operating envelope for ESP1 encloses the projected decline curve for the well. However, at point $T_2$ the lower limit of the envelope crosses the decline curve 530. Beyond that point ESP1 is not a feasible solution and does not need to be considered as an option for calculation points 530 that follow $T_2$. Thus, in this example it can be removed from the solution set for times after $T_2$. At point $T_1$ the recommendation is to change to lift type RP. The operating envelope for the selected RP configuration is shown as curves 515 and 520, which surround the projected decline curve past point $T_3$ which is the next point at which the recommendation is to change the lift type. In fact, the RP configuration envelope is projected to be feasible beyond that $T_3$ but based on a cost analysis the recommendation is to change the lift type to another configuration of an ESP lift at this point, i.e., to ESP2 in this figure.

Returning now to the embodiment of FIG. 3, once the feasible solutions have been identified and those which are not feasible have been eliminated, the remaining collection of solutions is conceptualized as a network of nodes, with each node corresponding to one of the feasible solutions. This information is then used to determine the costs for the remaining lift types and lift configurations (box 335) at each node. In some cases, cost might include both the operating cost for the calculation interval and the cost of changing over to a different lift type or configuration. Note that, as explained below, the operating cost is just one of many possible objective functions that could be used in the calculation that follows. Preferably, this will include at least the cost of the power (e.g., electricity) required to operate the lift for a period of time corresponding to the calculation interval. Additionally, other costs such as the installation and equipment cost, the preventive maintenance costs, the (e.g., monthly) operating costs, the mean time between failure and workover costs, etc., might be obtained for each type of lift. Further, and if desired, the depreciation of the lift equipment might be included as an item. The power usage can be calculated from performance models of each lift type/configuration combination. The expected cost could also be compared with a projected revenue stream calculation for this well to yield an estimate of the income for the operating period if desired. For example, the projected hydrocarbon price and production from the well as predicted by the decline curve could be used to estimate the revenue for that period.

If the end of the operating period has not been reached (the "NO" branch of decision item 340), the next operating point will be selected and the above process repeated. On the other hand, if the last operating point has been processed (the "YES" branch of decision item 340), the network of nodes produced above together with the associated cost of each will be used as follows.

If the last time point has been reached, the loop 323-340 will exit and the nodes and associated costs will be used to calculate a minimum cost well lifecycle plan. The lifecycle plan can then be budgeted for and implemented 345 in the field. As an example, and referring again to the example, of FIG. 2, the well operator should budget to reconfigure the existing lift configuration at time $T_1$ and $T_2$, replace the lift at time $T_3$, reconfigure the replacement lift at T4 and install another lift configuration at $T_5$. Note that in some instances financial information could be provided in connection with the assembled lifecycle plan (e.g., net present value of the expected cost or revenue time series, etc.).

If it is determined that the end of the designated time interval has been reached, the minimum cost path will be identified and presented to the user using an embodiment of the visualization system described below. The user will then be able to implement the plan by, for example, budgeting and planning for lift changes at predicted times in the future. Then when the designated time arrives, the lift can be changed according to the plan as originally calculated to subsequently modified. Subsequent modification might include, for example, instances where the decline curve in the future proves to be significantly different from the estimated decline curve when the calculation was done.

Additionally, and in some embodiments, certain financial information might be calculated and made available to a user to assist in deciding whether or not (or which) lifecycle plan to implement (step 355). The sort of financial information that might be useful would include, for example, the net present value of the operating cost assuming a discount rate or discount rate function, the expected profit from implementing the plan assuming an estimate of the future oil or other hydrocarbon price, etc. Given a series of cost estimates and/or income estimates together with a discount rate, it is well known how to determine the net present value of a cash stream and such might be useful in determining which calculated lift plan to implement.

Turning next to FIG. 4 which contains an embodiment of a first level of the instant visualization system, this sort of display might be presented to a user at the conclusion of the calculation phase illustrated in FIG. 3. In some embodiments, the optimization program will provide, in addition to the solution that minimizes (or maximizes) the objective function, a ranked list of other lifecycle solutions, where the sub-optimal solutions are ranked in terms of the value of the objective function. As can be seen, three different options have been presented to the user which are ranked in terms of their present value ("PV"). The first option is a lifecycle plan that has a projected present value of $100 million if implemented as calculated. Option 1 is the minimum cost solution obtained by the algorithm of FIG. 3 offset against the projected income if this particular lift lifecycle is adopted. Two other options are also presented, Options 2 and 3 have lesser calculated present values ($95 million and $60 million, respectively) but there are other tradeoffs as discussed below. Also presented is a graph of projected production decline curve versus time for this well 410. Note that this production decline curve could be based, in some embodiments, on the actual equipment configuration in the selected lifecycle option. This plot can be seen more clearly in FIG. 7 which is discussed below.

Each option in FIG. 4 has listed with it the particular lift combination (items 412, 413, and 414) that is associated with it. For example, lift combination 412 is "ESP-RP-GL" which indicates that the first lift type should be ESP, the second RP (rod lift), and the third GL (gas lift). With respect to option 2, the lift combination is ESP, followed by a differently configured ESP which is then followed by RP.

Additional information is given that a user might find useful in deciding between options. For example, each option lists how many barrels are expected to be produced according to that well lifecycle, the amount of deferred production ("bbl deferred") using that plan, how many workovers are predicted to be necessary, and how much down time over the prediction period. These are only some of the parameters that might be displayed to the user and, in some embodiments, the user will be able to choose which ones to display.

One reason for presenting the information in this way should now be clear. It allows a user to determine the tradeoffs he or she is willing to make. Although Option 1 has the greatest present value, Option 2 has the least downtime and Option 3 has the most deferred production. The user will be able to choose from Level 1 the option that makes the most sense to him or her and understand more fully the tradeoffs when the information is displayed in this way.

Additionally, a "Tech Score" is presented for each option. This is a quantitative value that assesses the risk level associated with implementing the particular lift plan. One way to create such a score is to implement a rules engine which embodies heuristic rules from industry experts that assesses the level of suitability for a particular lift type for particular well conditions. In one embodiment, the rules are of three types. The first type of rule is expressed as depth versus volume lookup tables for each lift type and sub-tables exist for each casing and tubing size. These tables were based on calculations performed using design software as well as typical rules of thumb from prior experience. The second category consists of "Disallow" rules expressed as "IF . . . THEN . . . Disallow" which causes the lift type to be disallowed if even just one such rule is triggered (e.g., the lift is too big for the well). An example would be if a lift type physically cannot fit into the wellbore. In such a case, the evaluation of any other rules is irrelevant since the lift type simply cannot work. The third category consists of "Warning Rules" expressed as "IF . . . THEN . . . Add Penalty", for which satisfying the IF statement results in a penalty deducted from the lift type. Each warning rule might have a different penalty factor depending on the severity of it being violated as some rules of thumb are more severe than others. The penalties associated with multiple warning rules could be added together in determining the total penalty score for the given lift type and configuration. The penalties associated with multiple warning rules could be added together or otherwise combined (e.g., a weighted average, a total, a geometric average, the maximum of the penalties, etc., could be computed) in determining the overall penalty for the given lift type and configuration. In some cases, the penalty could be applied to cost information at each node to make its "distances" to the next node longer, thereby making it more disfavored in the final solution. This total lift plan penalty score can then be normalized to provide an assessment of technical risk that is comparable across lift plans. In the present example, the Tech Score is inverse to the risk (eg. low score equals high risk, and high score equals low risk)—but we should not be limited to this interpretation.

Figure 7:
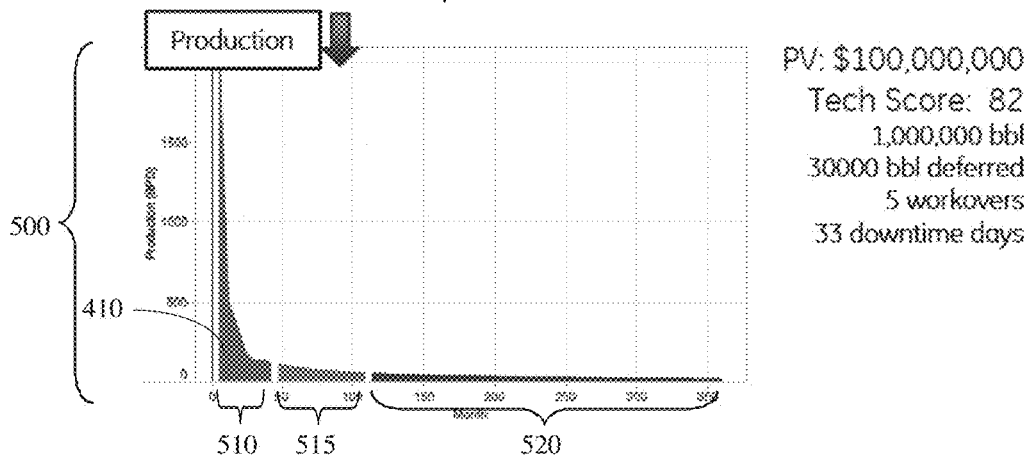
FIG. 7 contains a screen display of a well lifecycle lift plan details according to an embodiment.

Turning now to example of FIG. 7, the chart 500 in this figure shows the Level 2 analysis which is an expanded and enhanced view of Option 1 from FIG. 4. The decline curve 410 can now be seen more clearly. The vertical axis is production in barrels per day, but of course, it could be production of any fluid (including gas) from the wall. The horizontal axis is "time" in years. Also more clearly visible is the fact that the curve is interrupted in two places. There are three sections 510, 515, and 520 which correspond to lift options ESP, RP, and GL, respectively.

In still another embodiment, a recommended lift plan may be represented as a graph of value over time. An example of such an embodiment is shown in FIG. 10. In this figure the vertical axis dimension is described differently than before and, indeed, could be cast in still other ways. In this example, the vertical axis is "cash flow" which might be based purely on revenue (e.g., calculated from the estimated volumes of oil and gas produced and the commodity prices of oil and gas) or it might include deductions for costs. This is just one example of the way that the decline curve might be recast and others include produced material, avoidance of downtime (risk), cost of water disposal, or any other "value" metric. It should be noted that negative value can be clearly expressed using this construct, and the example shown in FIG. 10 includes two examples of negative cashflow during periods between the removal of a first lift pump and the installation of a second lift pump. This negative value may represent the capital cost of the newly installed equipment, the cost of performing the workover, the value of the oil and gas not produced during the downtime, or a combination of these costs.

Returning to FIG. 7, below the chart are details associated with each of the lift configurations and the projected date when it is to be put into service. For example, the row corresponding to 510 indicates that during that time period in the chart 500 the ESP lift has the configuration "ESP338-motor-cable" which corresponds to a motor size and other parameters related to the lift. The other rows similarly contain details of the other lift configurations which are recommended in this option.

Finally with respect to FIG. 7, section 550 contains a detailed financial breakdown for the selected lift type by year. This variation has many of the key elements of an income statement (oil revenue, gas revenue, install costs, workover costs, operating costs, power costs) provided in an annual (or other time element) breakdown, as well as the present value calculated, preferably using a user provided rate of return. Further down in the table, additional parameters such as liquid production, oil production, gas production, deferred production, downtime are also provided per time element (annual) and totaled over the life of the well for this well.

Figure 8:
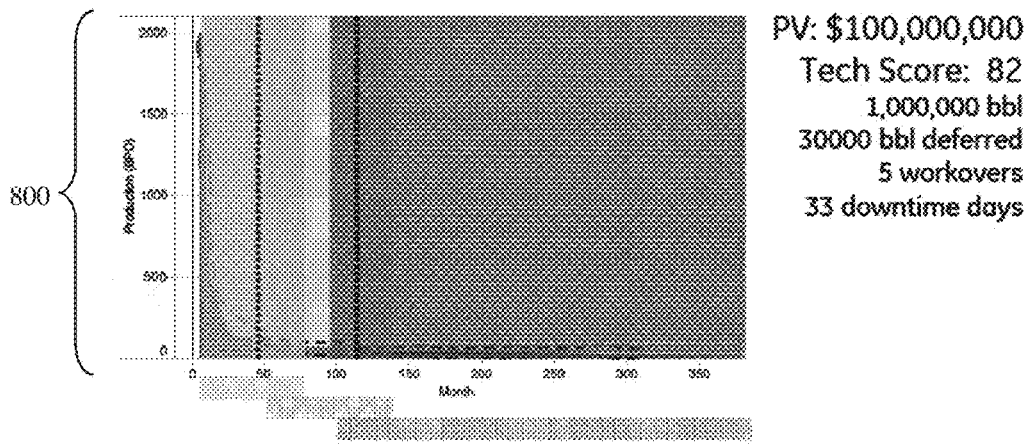
FIG. 8 contains a schematic illustration of additional details of the well lifecycle lift plan of FIG. 7.
Figure 9:
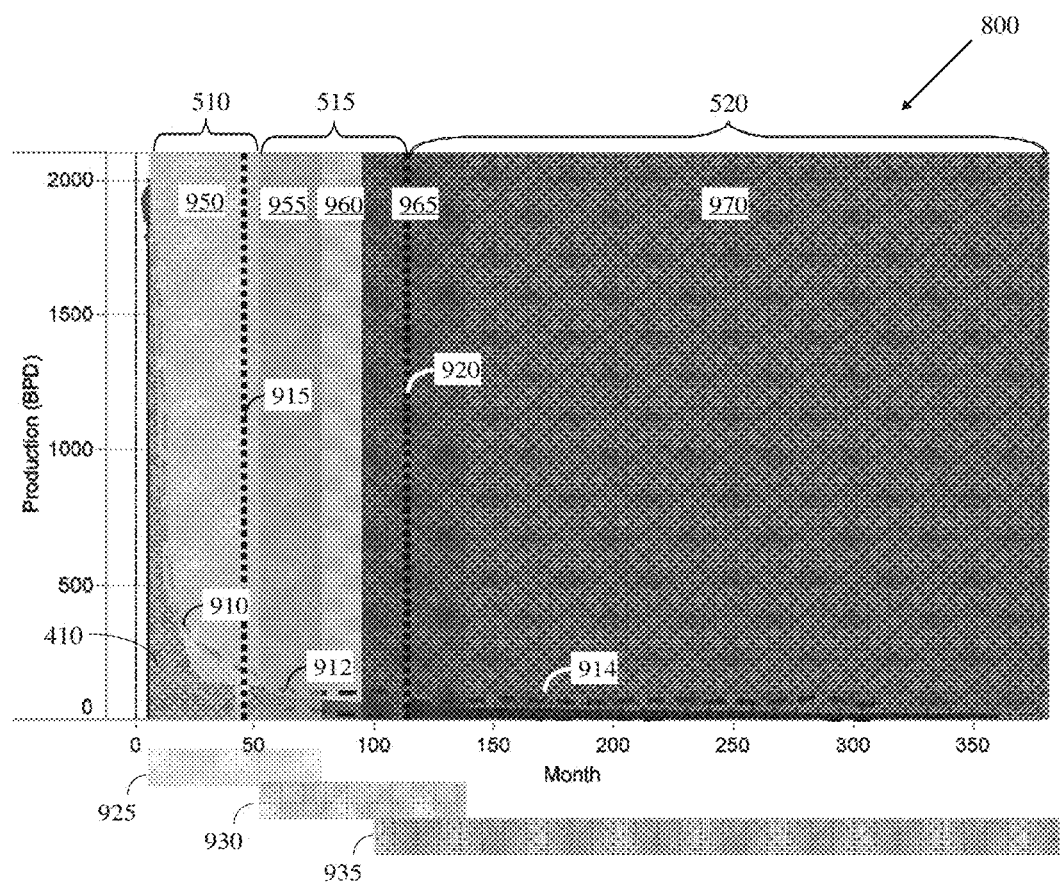
FIG. 9 contains an expanded view of a chart from FIG. 8.

Turning next to FIG. 8, this aspect of the instant visualization program represents the Level 3 analysis and contains an interactive chart 800 that is explored in greater detail in FIG. 9. Note that the bottom portion of the table 550 is not reproduced here since it is identical to the table 550 of FIG. 7 which is displayed in its entirety. FIG. 9 contains a schematic representation of an interactive chart that is designed to assist a user in selecting a particular lift lifecycle plan for a well by exploring variations around the selected option.

As a first example, the range of operation (operating envelope) for each lift type can be shown using, for example, a dashed line 910/912/914 or a shaded area around the curve. This range of operation would typically be determined by use of the underlying technical analysis which performed engineering design calculations for this specific lift configuration for this specific well.

In some embodiments this will be semi-transparent regions overlaid (e.g., region 950/955, region 955/960/965, and region 965/970) and/or separate bars 925, 930, and 935 that have been printed under the graph or some other way. These limits in this case are based on the underlying engineering calculations for each lift type. Note, it is likely operating ranges will overlap at the changeover points which are the endpoints of regions 510, 515, and 525.

In some embodiments a sensitivity analysis will be provided as an option. Procedurally, the user will be allowed to click and drag the timeline bars from side to side to determine the impact of delaying or advancing the changeover point(s). The range over which user would be able to adjust the changeover points would typically be limited by the operating range of each lift type. Preferably, this, would also update the financials by the operating (up to the limits from Feature #1) and this dynamically updates the financials. This is driven by the underlying analytics that are calculating the financial implications of modifying the lift plan from the baseline.

By way of explanation, one possible way to do this given a fixed/selected well lifecycle with given changeover points is to modify the associated time series and recalculate the parameters of interest from it. That is, in this example each time point in the series has (at most) three possible configurations associated with it: ESP, RP, and GL. Of course, in this scenario the feasible time-range of each lift type is limited so, in actuality, there are fewer than three options available at some time points. Associated with each time point and lift type is information such as operating cost, production, etc., which is dependent on the lift and lift configuration. Thus, a time series can be constructed for each lift type/configuration, where the lift time series may not extend over the entire operating period.

As such, allowing the user to move the changeover point(s) means that the analytics can construct a new time series in real time in background by extracting the appropriate cost, production, etc., information from each lift time series and then calculating financials, etc., from the assembled information. In this way, the calculated optimum lift plan can be used to obtain real-time variations in the solution. Of course, this is just one way to do this and those of ordinary skill in the art will understand that there are many other ways this might be done.

In this embodiment a financial table is dynamically updated via calculations on the backend as the user relocates the selected changeover point.

In some embodiments, the sensitivity analysis will also allow the user to click and drag portions of the production decline curve up and down This allows the user to explore "over-producing" or "under-producing" relative to the baseline production decline curve since the lift types have a range of operability as shown in FIG. 5, and the operator could choose to operate differently By moving a portion of the decline curve, the user can perform a sensitivity analysis to understand the financial impact of under- or over-producing. The range over which user would be able to adjust the production decline curve would typically be limited by the reservoir conditions as well as the operating range of each lift type.

Figure 11:
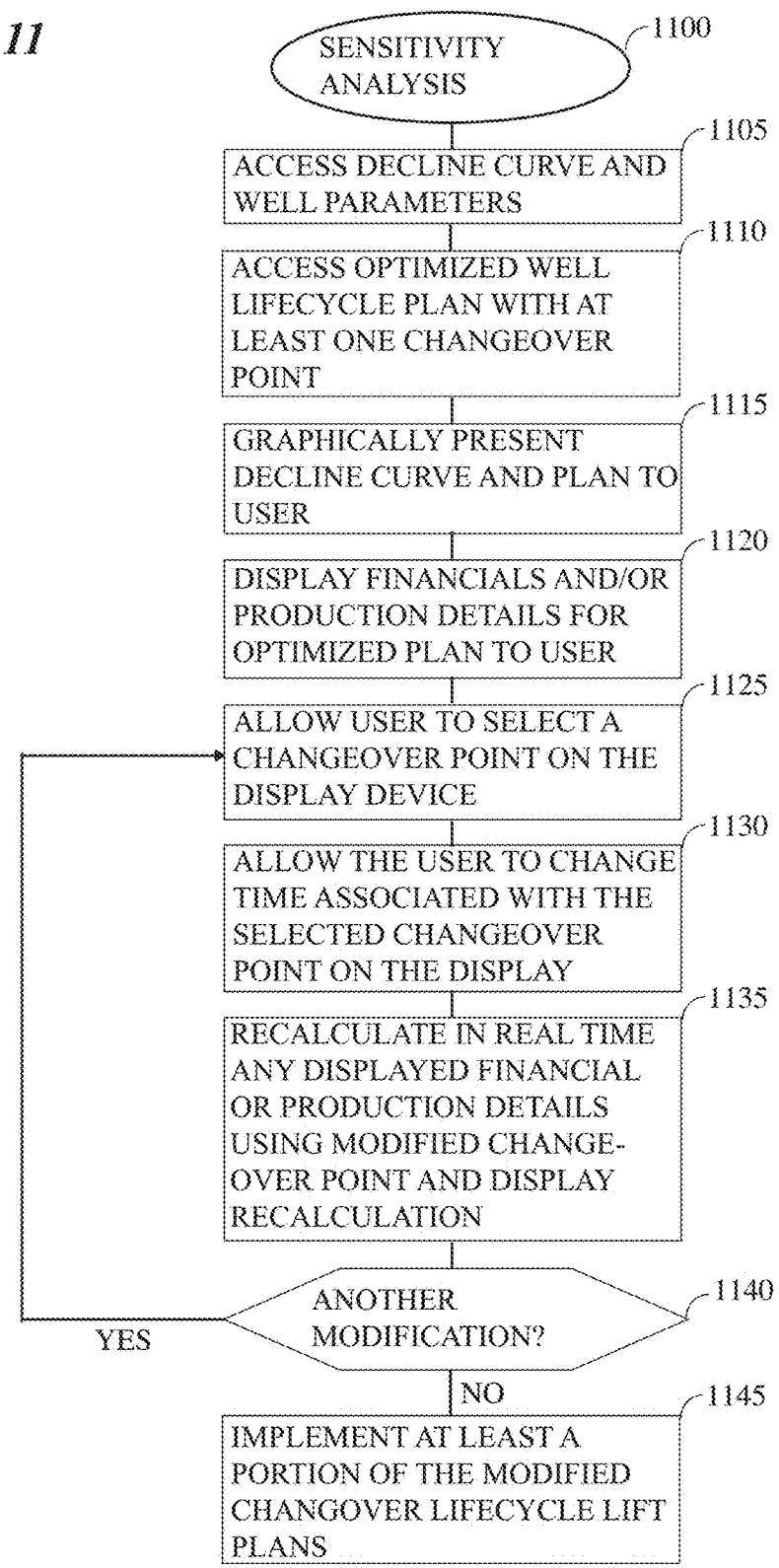
FIG. 11 contains an illustration of an operating logic suitable for use with an embodiment.

With respect to FIG. 11, this figure contains a representation of a program logic that would be suitable for use with some embodiments and especially with the Level 3 approach. In some variations, the user will be able to perform a sensitivity analysis 1100 as follows. A decline curve and parameters for a subject well will be accessed 1105. Additionally, an optimized well lift plan will be provided or calculated 1115, as the case may be. The foregoing will then be displayed on a graphical device 1115 and, additionally, information such as financial and/or production details associated with the optimized plan will also be displayed on the graphic display device.

Next, the user will be allowed to select a changeover point on the display device 1125 which might be done with a mouse, keyboard, stylus, etc., according to techniques well known to those of ordinary skill in the art. The user will then be allowed to adjust the timing of the selected changeover, typically by moving it laterally and interactively on the display device. This change will result in a modified lift plan. Next, the calculation engine will use the optimized plan to recalculate and the displayed financial or production details (1135) for the modified plan in real time. The user will be given the option to move another changeover point or move the same point again (decision item 1140). If there are no further modifications, the user will be able to implement at least a portion of one of the modified lifecycle lift plans (1145). By examining how the financial and/or production information is modified with changes to the changeover point(s), a sensitivity analysis can be obtained.

Note, by performing sensitivity analysis, the user has tailored the option to their specific needs, but has likely also generated a new option that is not mathematically optimal. In that case, the user will be provided with the option to save financial, production, and timing data related to the modified well lifecycle plan.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

For purposes of the instant disclosure, the term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Terms of approximation (e.g., "about", "substantially", "approximately", etc.) should be interpreted according to their ordinary and customary meanings as used in the associated art unless indicated otherwise. Absent a specific definition and absent ordinary and customary usage in the associated art, such terms should be interpreted to be ±10% of the base value.

When, in this document, a range is given as "(a first number) to (a second number)" or "(a first number)-(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A computerized method of managing production in a hydrocarbon producing well, comprising the steps of:
   a. accessing a decline curve for the well, said decline curve predicting hydrocarbon production from the well over a predetermined period of time;
   b. accessing a lifecycle plan for the well, said lifecycle plan specifying a use of at least two different lift methods and containing at least one changeover point, each of said at least one changeover points occurring a time within said predetermined period of time;
   c. forming a graphical representation on a display device of said decline curve and said lifecycle plan, wherein each of said at least one change over points is represented by a graphical indicium on said display device;
   d. displaying at least one of financial information associated with lifecycle plan and production information associated with said lifecycle plan;
   e. allowing a user to select on said display device one of said graphical indicium associated with one of said at least one changeover points;
   f. allowing a user to adjust on said display device a time location of said selected changeover point, thereby producing a modified lifecycle plan for the well;
   g. using at least a portion of said lifecycle plan to calculate and display on said display device in real time a modified financial information associated with said lifecycle plan if said financial information was displayed or a modified production information if said production information was displayed; and,
   h. making at least one lift decision in the well using said modified lifecycle plan.

2. The computerized method of managing production in a hydrocarbon producing well according to claim 1, wherein said financial information includes at least one of a predicted net present value of an income stream for said lifecycle lift plan, a total equipment cost for said lifecycle lift plan, and an income statement for said lifecycle lift plan.

3. The computerized method of managing production in a hydrocarbon producing well according to claim 1, wherein said production information includes at least one of a total fluid production, an oil production, a gas production, a down time, a quantitative risk, or a technical feasibility score.

4. A multilevel computerized method of managing production in a hydrocarbon producing well, wherein is provided a computer display, comprising the steps of:
   a. accessing a decline curve for the well, said decline curve predicting hydrocarbon production from the well over a predetermined period of time;
   b. accessing a plurality of lifecycle plans for the well,
      wherein each of said plurality of lifecycle plans has an objective function value associated therewith,
      wherein each of said plurality of lifecycle plans specifies a use of at least two different lift methods during said predetermined period of time, and,
      wherein each of said plurality of lifecycle plans specifies a changeover point between each of said at least two different lift methods;
   c. selecting a number of said plurality of lifecycle plans to display;
   d. presenting on said computer display an ordered list of said selected number of lifecycle plans with said selected number of lifecycle plans being ordered based on each lifecycle plan's objective function value;
   e. allowing a user to select one of said number of ordered lifecycle plans;
   f. for said selected lifecycle plan, forming a graphical representation on a display device of said decline curve and said lifecycle plan, wherein each of said at least one change over points is represented by a graphical indicium on said display device;
   h. displaying at least one of a financial information associated with lifecycle plan and a production information associated with said lifecycle plan;
   i. allowing a user to select on said display device one of said graphical indicium associated with one of said at least one changeover points;
   j. allowing a user to adjust on said display device a time location of said selected changeover point, thereby producing a modified lifecycle plan for the well;
   k. using at least a portion of said lifecycle plan to calculate and display on said display device in real time a modified financial information associated with said lifecycle plan if said financial information was displayed or a modified production information if said production information was displayed; and,
   l. making at least one lift decision in the well using said modified lifecycle plan.

5. The method of claim 4, wherein step (h) comprises the steps of:
(h1) displaying at least one of a financial information associated with lifecycle plan and a production information associated with said lifecycle plan, and,
(h2) displaying on said display device configuration details for each of said at list two different lift methods associated with said selected lifecycle plan.

6. The method of claim 4, wherein said objective function value is selected from the group consisting of a net present value, a cash flow total, and an operating cost.

\* \* \* \* \*